(12) United States Patent
Neubauer et al.

(10) Patent No.: US 6,326,588 B1
(45) Date of Patent: Dec. 4, 2001

(54) METHOD FOR CUTTING Y BEVELS

(75) Inventors: Norbert Neubauer, Nuremberg; Peter Heine, Maintal, both of (DE)

(73) Assignee: Messer Cutting & Welding Aktiengesellschaft (DE)

( * ) Notice: Subject to any disclaimer, the term of this patent is extended or adjusted under 35 U.S.C. 154(b) by 0 days.

(21) Appl. No.: 09/366,258

(22) Filed: Aug. 3, 1999

(30) Foreign Application Priority Data

Aug. 4, 1998 (DE) ............................................... 198 35 057

(51) Int. Cl.$^7$ .................................................... B23K 26/00
(52) U.S. Cl. ............................... 219/121.72; 219/121.44; 219/121.6; 219/121.41; 219/121.39; 219/121.67
(58) Field of Search ....................... 219/121.72, 121.44, 219/121.6, 121.41, 121.39, 121.67

(56) References Cited

U.S. PATENT DOCUMENTS

| 3,597,578 | * | 8/1971 | Letchworth et al. | 219/121 L |
| 3,604,890 | * | 9/1971 | Mullaney | 219/121 L |
| 4,648,298 | * | 3/1987 | Sutton | 83/62 |
| 4,827,436 | * | 5/1989 | Sabersky et al. | 364/559 |
| 4,856,902 | * | 8/1989 | Wiedemann | 356/375 |
| 5,286,006 | * | 2/1994 | Ogura | 266/77 |
| 5,400,145 | * | 3/1995 | Suita et al. | 356/401 |

* cited by examiner

Primary Examiner—M. Alexandra Elve
(74) Attorney, Agent, or Firm—Connolly Bove Lodge & Hutz LLP

(57) ABSTRACT

In the method for producing components (2) with a beveled cut edge (Y bevel), a vertical laser beam (5) is used to make at least one vertical cut through the material (1), parts (3) of the material (1) which lie outside the component (2) are removed, and then an inclined laser beam (6) is used to make an inclined cut along the vertical cut edge produced.

9 Claims, 1 Drawing Sheet a)

b)

c)

d)

METHOD FOR CUTTING Y BEVELS

BACKGROUND OF INVENTION

Figure 1:
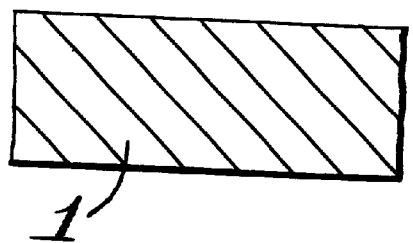
Figure 1:
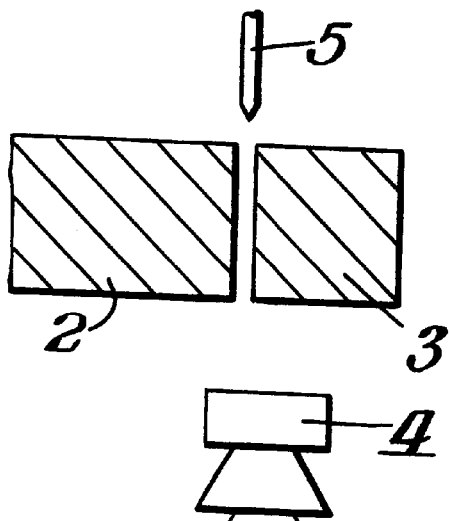
Figure 1:
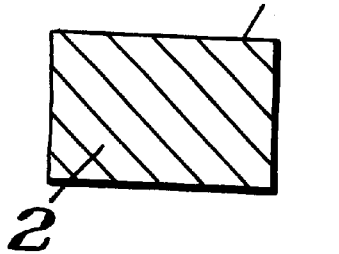
Figure 1:
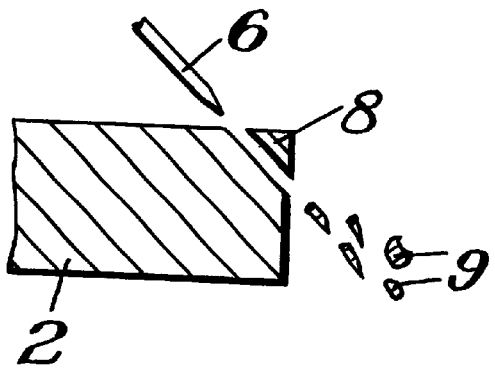

This application is related to DE 198 35 057.0 filed on Aug. 04, 1998, which is incorporated by reference in its entirety for all purposes.

The invention relates to a method for cutting Y bevels by means of a laser.

It is often essential to chamfer sheet-metal edges, for example in shipbuilding or in the construction of plant and machinery, in order for a subsequent welding process to be carried out. The chamfering of sheet-metal edges by means of inclined laser cutting on the isolated component is described in Laser 5, 1997, pp. 6–10. In such a method, firstly a vertical cut has to be carried out using the laser, and then the top part of the cut surface has to be removed by means of an inclined cut. This method has the drawback that the leftover metal sheet has to be removed from the cutting bench in order to create sufficient space for the slag to be expelled during the inclined cutting operation. Otherwise, there is a risk of the product and the leftover metal sheet fusing together. A handling operation is required for the leftover metal sheet to be removed. This operation entails the drawback that the position of the component (product) may change.

Cuts made in the reverse order (firstly inclined cut, followed by vertical cut) do not give a satisfactory result. The inclined cutting gap prevents a clean vertical cut from being formed, since the slag cannot be expelled cleanly downwards.

SUMMARY OF INVENTION

The invention is based on the object of providing a method which does not have the drawbacks mentioned above.

In accordance with this invention components are produced with a beveled cut edge (Y bevel) wherein a vertical laser beam makes at least one vertical cut through the material. Parts of the material outside the flat component are removed. An inclined laser beam then makes an inclined cut along the vertical cut edge produced on the component. After the vertical cut edge has been produced, a position-detection device detects the position of the component produced and the information is transmitted to a control unit.

THE DRAWINGS

FIGS. 1a) to d) diagrammatically show the method steps involved in the practice of the invention.

DETAILED DESCRIPTION

A suitable laser-cutting appliance for carrying out the method according to the invention is, for example, a laser-cutting appliance with a rotary laser head, which can be procured under the name LaserMat® from Messer Cutting & Welding. The laser-cutting appliance is described in Brochure No. 0,815,090, edition 9207/III dd, Messer Griesheim Schweiβtechnik GmbH + Co. 1998, relating to the LaserMat® machine, available from Messer Griesheim Schweiβtechnik GmbH + Co., Cutting Systems Division, Otto-Hahn-Str. 2–4, D-64823 Groβ-Umstadt, to which brochure reference is hereby made.

A suitable laser-cutting appliance is also described in Laser 5, 1997, pp. 6–10, to which reference is hereby made.

The method is preferably suitable for producing flat components, preferably from flat materials, such as metal sheets.

The thickness of the machined metal sheets generally lies in the range from 1 to 50 mm, preferably in the range from 5 to 20 mm. The metal sheets consist, for example, of steel, structural steel or shipbuilding steel, stainless steel or aluminum.

The gap width of the vertical cuts made using laser-cutting appliance generally lies in the range from 0.1 to 1 mm, preferably in the vicinity of 0.5 mm.

The contour of the component(s) is cut out using a laser machining head which is positioned at right angles to the surface of the metal sheet. The leftover metal sheet is then removed. To prevent any slippage of the components while the leftover metal sheet is being removed from causing any inaccuracy, the position is checked using a system for detecting the position of the component. If a change in the component position is detected (rotation and translational movement), information about this change is transmitted to the control unit. The measured displacement of the component is taken into account during the following inclined cut carried out using the laser.

A suitable device for detecting the position of the component operates, for example, using a laser-cutting sensor, described in "Heckel, W.; Optische 3D-Konturerfassung und on-line Biegewinkelmessung mit dem Lichtschnittverfahren, Reihe Fertigungstechnik Erlangen, [Optical 3D-contour detection and on-line bending-angle measurement using the laser-cutting method, Manufacturing Technology Series, Erlangen], Volume 43, Bamberg-Meisenbach 1995", to which reference is hereby made.

To produce a greater gap width with the vertical cut, e.g. a gap width in the range from 1 to 6 mm, preferably 2 to 4 mm, a plurality of laser cuts may be made in succession. This greater gap width is wide enough for it to be possible to produce the Y bevel in one further step (inclined cutting operation). In this case, there is no need to remove leftover material and for the position of the component to be detected.

The method according to the invention is explained with reference to FIG. 1, using the example of a steel sheet as the flat material.

FIG. 1a) to d) diagrammatically show the method steps involved in laser cutting with removal of leftover material (laser/removal/component position-detection laser method).

FIG. 1a) shows the metal sheet 1 before machining. FIG. 1b) shows the metal sheet 1 after a vertical cut has been made using vertical laser beam 5, with a width of 0.5 mm, for example. The resultant parts component 2 and leftover metal sheet 3 can be seen. Leftover metal sheet 3 is removed. In the next step, FIG. 1c), the position of the component 2 is recorded using the position-detection device 4. The position of the component 2 is fed to the control unit for the laser. This is followed by the inclined cutting operation using inclined laser beam 6, with the laser head positioned at an angle (FIG. 1d), forming the component 2 with a finished cut edge (Y bevel), waste piece 8 and slag 9.

What is claimed is:

1. A method for producing components with a beveled cut edge (Y bevel), wherein a vertical laser beam is used to make at least one vertical cut through the material, parts of the material which lie outside the flat component are removed, after the vertical cut edge has been produced, a position-detection device is used to detect the position of the component produced and the information obtained is transmitted to a control unit, and then an inclined laser beam is used to make an inclined cut along the vertical cut edge produced on the component.

2. The method as claimed in claim 1, wherein the position-detection device operates after the laser-cutting method.

3. The method as claimed in claim 2, wherein the material used is a flat metal sheet whose thickness lies in the range from 1 to 50 mm.

4. The method as claimed in claim 3, wherein the laser beam produces a cut whose width lies in the range from 0.1 to 1 mm.

5. The method as claimed in claim 1, wherein the material used is a flat metal sheet whose thickness lies in the range from 1 to 50 mm.

6. The method as claimed in claim 1, wherein the laser beam produces a cut whose width lies in the range from 0.1 to 1 mm.

7. A method for producing components with a beveled cut edge (Y bevel), wherein a vertical laser beam is used to produce more than one vertical cut through the material, so that a gap with a width of at least 1 mm is formed, and then an inclined laser beam is used to make an inclined cut along the vertical cut edge produced on the component.

8. In a method for producing components with a beveled cut edge (Y bevel), the improvement being in using a position-detection device for detecting the position of the component produced.

9. The method as claimed in claim 8 wherein laser cutting is used for making a cut in the component, and the position-detection device is used after the laser cutting step.

* * * * *